United States Patent [19]

Hulls

[11] Patent Number: 5,472,290
[45] Date of Patent: Dec. 5, 1995

[54] JOINT WITH TAPERED EDGES

[75] Inventor: John Hulls, Point Reves, Calif.

[73] Assignee: Altamont, Inc., Key Biscayne, Fla.

[21] Appl. No.: 71,243

[22] Filed: Jun. 2, 1993

[51] Int. Cl.⁶ ................. F04B 2/60; F04B 9/30
[52] U.S. Cl. ............ 403/407.1; 52/270; 52/284; 52/282.4; 403/231
[58] Field of Search ............... 403/231, 233, 403/407.1, 406.1; 52/272, 270, 282.3, 282.4, 284, 79.1

[56] References Cited

U.S. PATENT DOCUMENTS

| | | |
|---|---|---|
| 2,934,372 | 4/1960 | Jewell et al. ............... 52/282.4 |
| 4,065,885 | 1/1978 | Blick, III et al. ............. 52/282.4 |
| 5,041,318 | 8/1991 | Hulls . |

*Primary Examiner*—Richard A. Bertsch
*Assistant Examiner*—William Wicker
*Attorney, Agent, or Firm*—Majestic, Parsons, Siebert & Hsue

[57] ABSTRACT

A joint with tapered edges allows, by means of the taper, a gradual transmission of the loads from panel to joint to adjacent panel such that the panels contribute not only as a shear web between the tensile and compressive members but also contributes to the compressive, tensile and bending loads of the corner structure and such that the combined structure of joint and panels behave as a monocoque structure. This joint allows for a lighter weight preformed panel to be used.

6 Claims, 4 Drawing Sheets

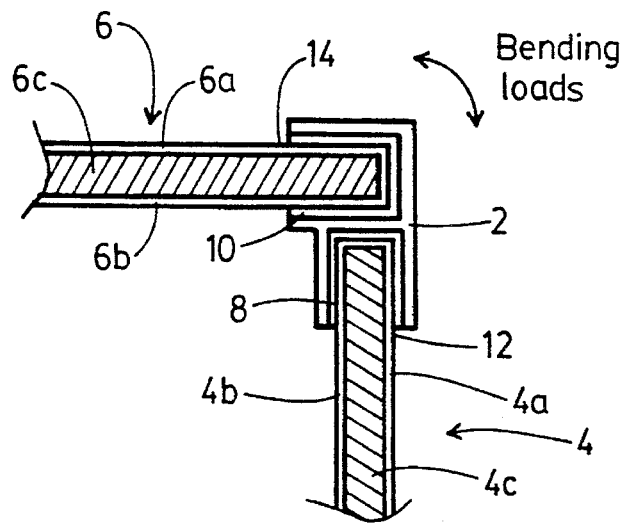
FIG._1.
(PRIOR ART)
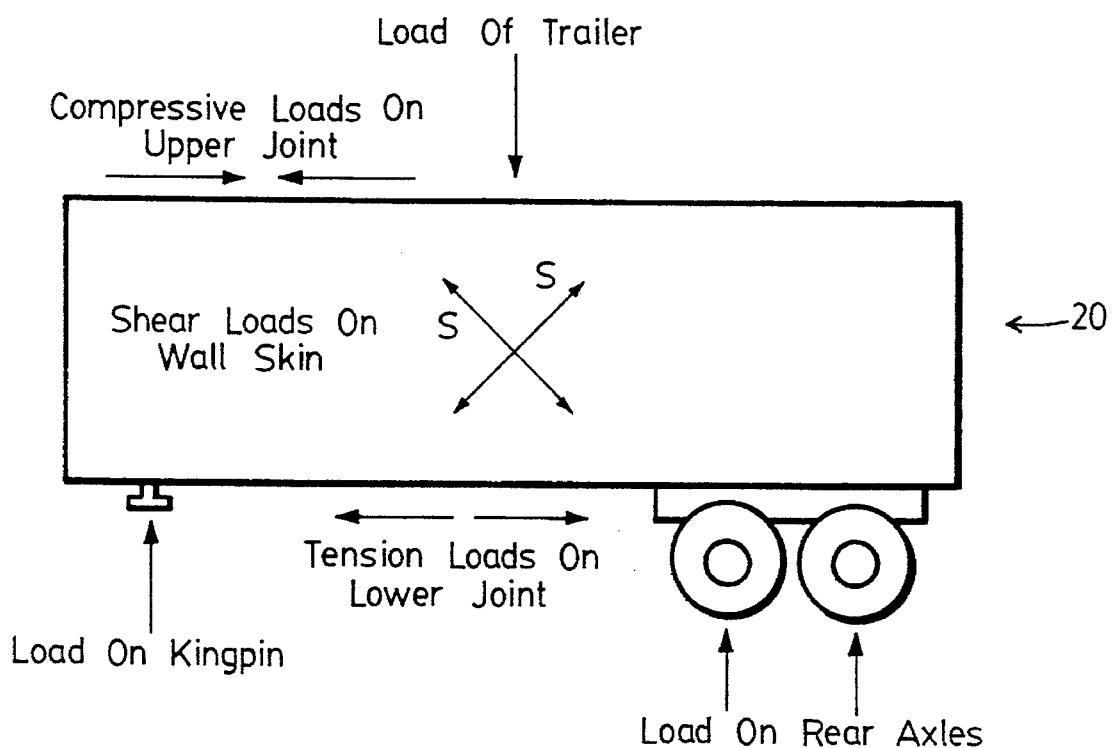
FIG._2.
(PRIOR ART)

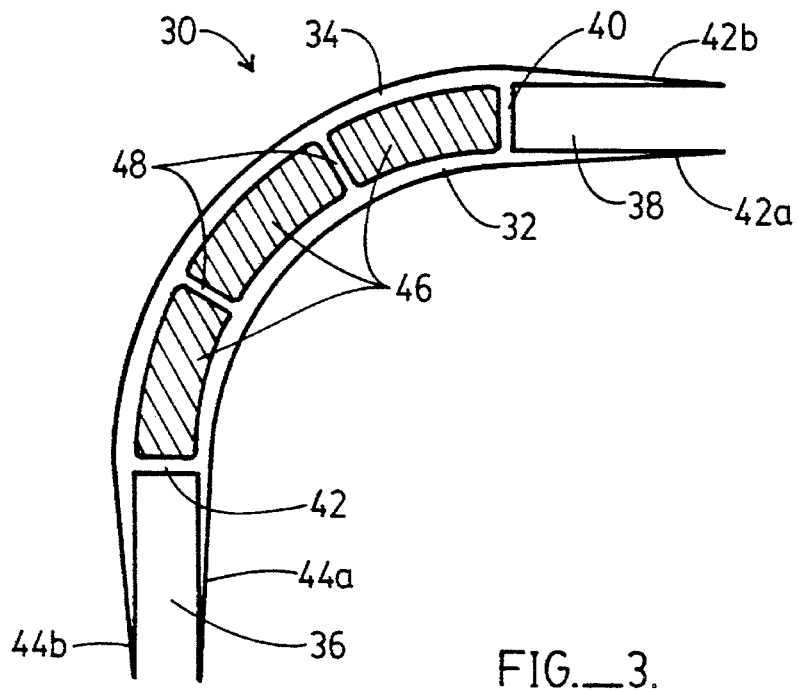
FIG._3.
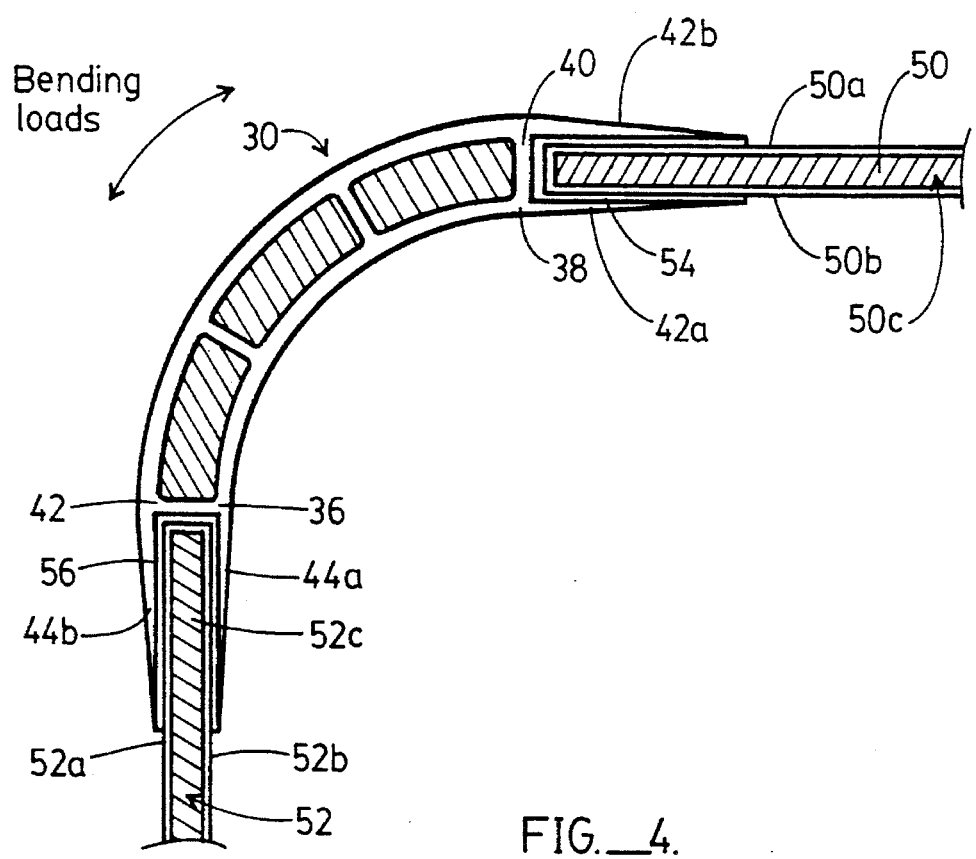
FIG._4.

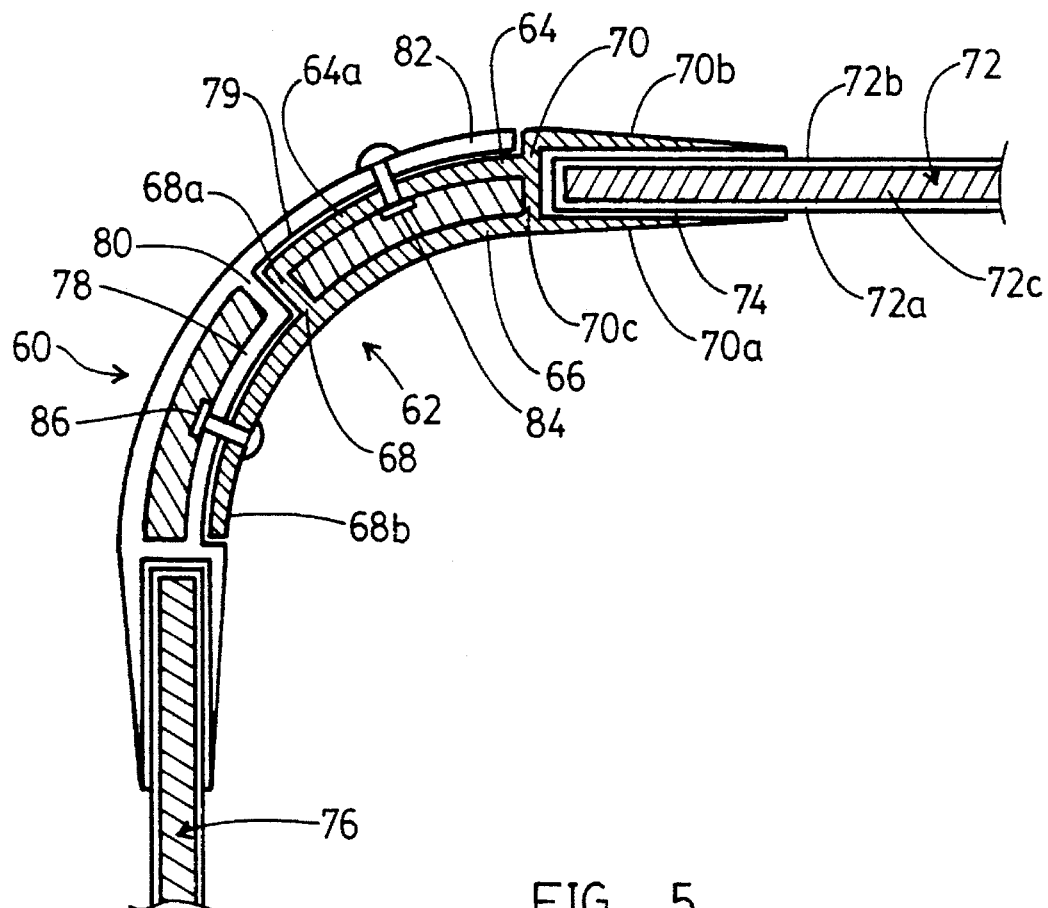
FIG._5.
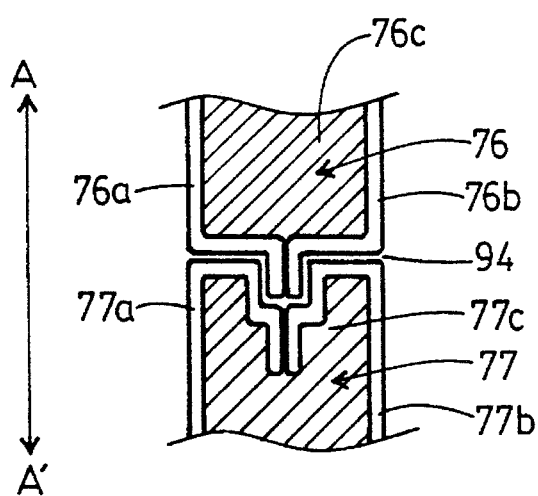
FIG._7.

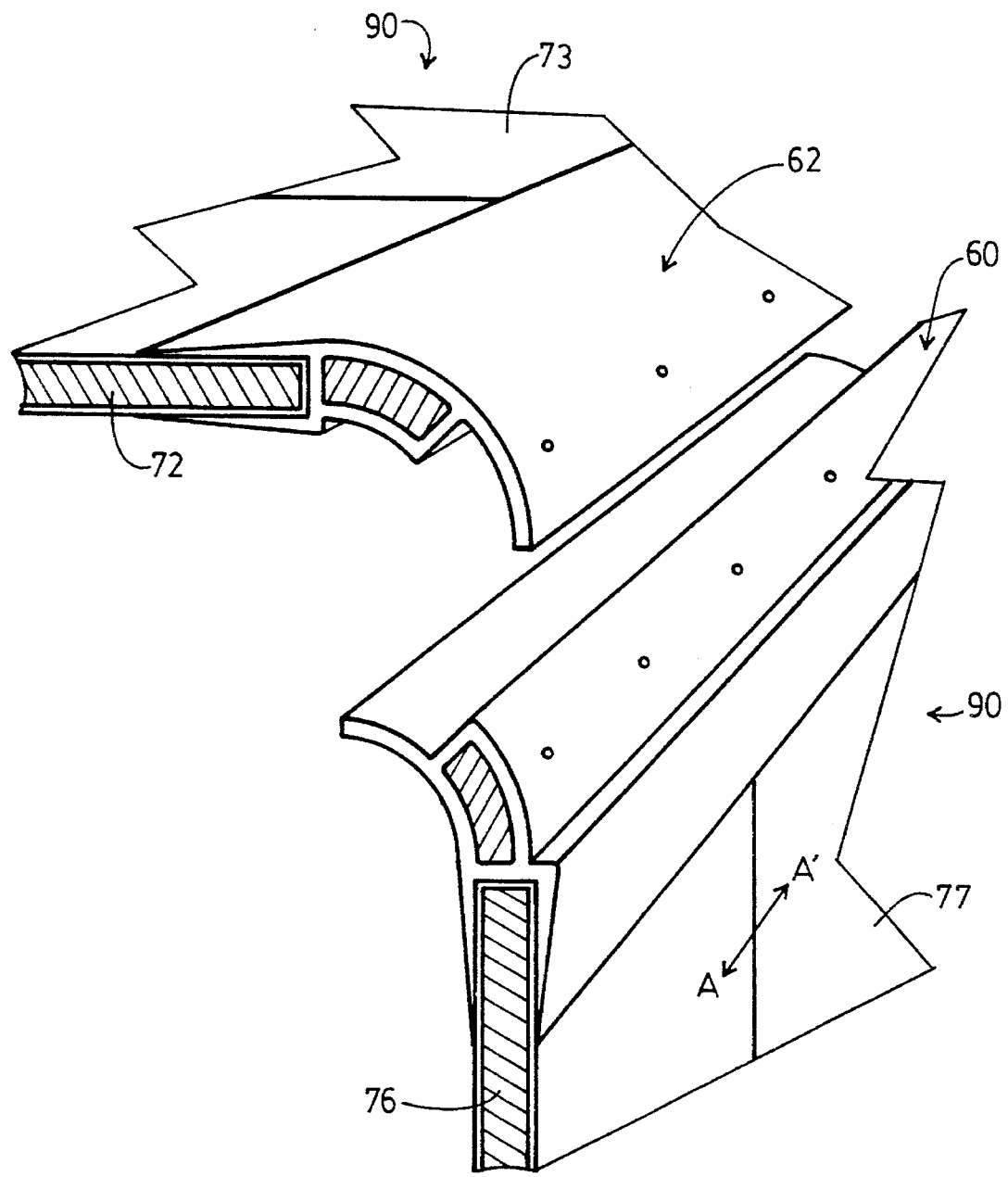
FIG._6.

JOINT WITH TAPERED EDGES

BACKGROUND OF THE INVENTION

This invention relates to joints used with composite structural members which are commonly used to form strong, yet lightweight structures.

Composite structural members comprise a number of fibers made of a high tensile and compressive strength material such as glass or carbon, encased within a suitable resin matrix. Often a number of resin and fiber layers are used to provide the desired strength. Other composite structural materials include a core material sandwiched between sheets which may or may not be composites themselves. A patent that shows a composite structural member is Hulls, U.S. Pat. No. 5,041,318, "Composite Structural Member with Integral Load Bearing Joint-Forming Structure."

FIG. 1 is a cross-sectional view of a prior art structure using pultruded composite materials connected by a joint 2. The joint 2 is typically formed out of aluminum. The joint 2 connects flat preformed panels 4 and 6. In this example, the preformed panels comprise an outer skin portion 4a and 6a, an inner skin portion 4b and 6b and core materials 4c and 6c. The preformed panels 4 and 6 are attached to the joint 2 by adhesive layers 8 and 10, respectively. A problem with this type of joint 2 is that it may not adequately protect against the torsion loads caused by uneven roads and bumps encountered by a tractor trailer truck or the bending forces caused by loads in the trailer. In this conventional joint, these loads show up as bending loads at the joint 2. These bending loads cause pressure at the skins of the preformed panels 4 and 6 at points 12 and 14. These bending loads may urge the panel skins together crushing the core or urge the skins apart causing them to separate from the core material.

A common example of a structure made up of a series of joint panels is a semi-trailer, illustrated diagrammatically in FIG. 2. The load on the floor of the trailer 20 will cause the floor to deflect downward. The resulting forces being tension at the edge pieces of the floor and compression on the upper edge. For this reason, in the conventional trailer construction as shown in FIG. 1, the corner joints are made sufficiently stiff so that they carry virtually all the compressive and tension load. The size and resulting stiffness of the of the corner joint is such that the wall panels make little contribution to the load carrying structure. The wall panels, however, do function in shear between the compressive and tensile members as shown in FIG. 2.

SUMMARY OF THE INVENTION

The present invention is a joint configured such that when the joint is attached to preformed wall panels, the preformed wall panels contribute to the tension and compressive loads and the torsional loads are transmitted through the surfaces of the joint to the adjacent preformed panel.

Furthermore, the present invention is a joint made with tapered edges which can allow for a thinner skin on the preformed panels. The thinner skin on the preformed panels will reduce the weight of the preformed panels. In this manner, the costs of producing these preformed panels and the fuel costs of the tractor-trailer can be reduced.

An additional benefit of the present invention is the use of a joint with tapered edges connecting to the preformed panels so that the joint does not act as a hinge, but will transmit loads into the skins of the preformed panels. In this manner, a significant portion of the torsional loads will be carried by the skins of the preformed panel. In the preferred embodiment, these joints have webs of a sufficient strength to prevent the local buckling due to the local shear within the joint. The web will also transmit loads from the inner and outer skin in the event of torsional deflection.

The use of the joint of the present invention produces a substantially monocoque body in which the loads feed through the skins provided that they are sufficiently supported to prevent buckling. Since the bending forces can be sent as tension and compression through the skin of the preformed panels, the panel skins will not be urged together crushing the core or urged apart causing them to separate from the core material. For that reason, the skin material of the preformed panels can be made thinner. As stated above, by making the skin material of the preformed panels thinner, the weight of the tractor-trailer can be decreased.

In addition, a curved trailer structure formed with the joints of the present invention has improved aerodynamic characteristics. The curved trailer structure can reduce the crosswind drag.

In one preferred form of the invention, the joint may be formed by a pultrusion process. The pultrusion process consists of pulling bundles of fibers through a resin bath and then through a heated die of the correct shape, such that the fibers and resin are cured into their final composite form as they exit the die. A foam core may be added at this time or latter.

One embodiment of the joint of the present invention is formed in one piece wherein the tapered edges at both sides of the joint are attached to the preformed panels. Alternatively, the corner joint can be made in two half-joint pieces wherein the first half-joint piece is attached to one preformed panel and the second half-joint piece is attached to the second preformed panel. The two preformed panels with half-joint sections can then be attached together.

The above and other objectives are realized by using a joint comprising an outer skin portion, an inner skin portion and two outer joint-forming sections each comprising a web section connecting the outer and inner skin portions and each comprising two tapered flange sections formed integrally with the inner and outer skin portions respectively. The joint-forming sections are adapted to receive a preformed panel. The shape of the tapered sections is such that when one of the outer joint forming sections is attached to the preformed panel, the joint will not act as a hinge but will transmit loads into the preformed panel. Preferably, the joint transmits loads into the skins of the preformed panels.

Additionally, the above and other objectives can be realized by using a structure comprising a half-joint section comprising an outer skin portion, an inner skin portion, an inner joint-forming section including a inner web section connecting the inner skin with an outer attachment portion of the outer skin and including an inner flange section integral with said inner skin and an outer joint forming section including an outer web section connecting said outer and inner skin sections and two tapered flanges sections formed integrally with the inner and outer skin.

Furthermore, the above and other objectives can be realized by using a structure comprising a plurality of preformed panels, and a joint structure being elongated along an axis. The joint structure is adapted to receive the plurality of preformed panels and shaped such that the plurality of preformed panels contribute to the load along the axis of the joint.

BRIEF DESCRIPTION OF THE DRAWINGS

The above and other features and aspects of the present invention will become more apparent upon reading the following detailed description in conjunction with the accompanying drawings, in which:

FIG. 1 is a cross-sectional view of a prior art joint structure used with composite materials;

FIG. 2 is a side view of a tractor-trailer;

FIG. 3 is a cross-sectional view of a preferred embodiment of the joint of the present invention;

FIG. 4 is a cross-sectional view of the embodiment of FIG. 3 showing in addition the preformed panels in fragmentary view;

FIG. 5 is a cross-sectional view of another embodiment of the joint of the present invention showing the preformed panels in fragmentary view;

FIG. 6 is an exploded perspective view of the joint shown in FIG. 5 showing preformed panels with the half-joint structure; and FIG. 7 is a partial cross-sectional view showing the connection of two preformed panels.

DETAILED DESCRIPTION OF THE PREFERRED EMBODIMENT

FIG. 3 is a cross-sectional view of a preferred embodiment of the joint of the present invention. The joint 30 is comprised of an inner skin portion 32 and an outer skin portion 34. Additionally, there are two outer joint-forming sections 36 and 38. Each joint forming structure includes a web section 40 and 42. Additionally, each outer joint-forming section includes two tapered flange sections, sections 42a, 42b, 44a and 44b. Tapered flange sections 42b and 44b are integrally formed with the outer skin portion 34 of the joint 30. Tapered flange sections 44a and 42a are integrally formed with the inner skin portion 32 of the joint 30. The tapered sections are formed in a shape such that when the outer joint forming sections 36 and 38 are attached to preformed panels, the joint will not act as a hinge but will transmit loads into the skins of the preformed panels. In other words, the joint will not deform about the axis of the joint, like a hinge, but will transmit the compressive and tensile loads to the preformed panel. In FIG. 3, the axis of the joint is normal to the page of the drawing.

The joint 30 may also include a core material 46 and interior web portions 48. The interior web portions 48 help prevent local buckling from the loads in all directions, compression, tension, and shear. Note that the core material 46 is sandwiched by the inner and outer skin layer 32 and 34. The inner and outer skin layers can be formed, for example, of high-strength fiberglass sheets.

FIG. 4 is a cross-sectional view of the embodiment of FIG. 3 showing the preformed panels in fragmentary view. The joint 30 is connected to the preformed panels 50 and 52 by the two outer joint forming sections 36 and 38. Since the sections 42a, 42b, 44a and 44b of the outer joint forming section 36 and 38 are tapered, the bending loads which are encountered by due to the load on the trailer and the torsion caused by uneven roads and bumps is transferred along the skins of the preformed panels 50 and 52. The preformed panels 50 and 52 include a outer skin portion 50a and 52a, an inner skin portion 52b and 50b and a inner core section 52c and 50c.

In addition to the sandwich type preformed panels shown in FIG. 4, the preformed panels could made of a multiplicity of elements, such as a series of pultruded box section tubes bonded together to form a wall panel. The preformed panel could also be formed by extrusion or hand layout of the materials. Laminated or molded architectural panels could also be used as the preformed panels. Other types of preformed panels could include metal laminated wood core, solid core faced panel, plywood on face, fiberglass reinforced plywood or metal panels with internal corrugation. The preformed wall panels could also be of some other design.

The web portions 40 and 42 will transmit loads from the inner and outer skin of the joint 30 to the preformed panels 52 and 50 in the event of torsional deflection.

Since the flanges of the joint 30 are tapered, the preformed panels 50 and 52 can be easily formed by a standard pultrusion process so that the skins 50a, 50b, 52a, and 52b can be of the same thickness throughout the preformed panels. Since the skins are of the same thickness, the production of the preformed panels is made easier. If these panels are formed with the pultrusion process, many preformed panels can be formed by merely cutting a continuous strip of pultruded material.

The tapered flange sections 42a, 42b, 44a, and 44b aid in the transfer of the bending loads to the skins of the preformed panels. Because the bending loads can be transferred into the preformed panel's skins, the thickness of the skins on the preformed panels 52 and 50 can be decreased. Decreasing the thickness of the skins on the preformed panels can ultimately decrease the weight of the composite structure. If the composite structure is a trailer for a tractor-trailer, this reduced weight can also reduce the fuel cost of the tractor-trailer. In addition, a curved structure formed with the joints of the present invention has improved aerodynamic characteristics.

Note that the tapered flange sections 42a, 42b, 44a, and 44b are attached to the preformed panels 50 and 52 using an adhesive 54 and 56 respectively. Alternatively, the tapered flange sections 42a, 42b, 44a, and 44b can be attached to the preformed panels 50 and 52 with other fastening means.

FIG. 5 shows a cross-sectional view of another embodiment of the joint of the present invention. This embodiment uses two half-joint sections 60 and 62. Half-joint section 62 includes an outer skin portion 64 and an inner skin portion 66. The half-joint section 62 also includes an inner joint-forming section 68. The inner joint forming section 68 includes an inner web section 68a connecting the inner skin 66 with the outer attachment portion 64a of the outer skin 64. The inner joint-forming section 68 also includes an inner flange section 68b integrally formed with said inner skin 66. The half-joint section 62 also comprises an outer joint forming section 70 including two tapered flange sections 70a and 70b integrally formed with the inner and outer skins 66 and 64. This outer joint-forming section 70, like the outer joint-forming sections 36 and 38 shown in FIG. 4, is adapted so that when the outer joint forming section is attached to a preformed panel the joint will not act as a hinge but will transmit loads into the skins of the preformed panels. The outer joint forming section 70 of FIG. 5 also includes an outer web 70c connecting the outer and inner skin sections 66 and 64.

This half-joint section 62 can be attached to a preformed panel 72 by use of an adhesive layer 74. As discussed above with respect to FIG. 4, the tapered flanges 70a and 70b help transfer load into the skins 72a and 72b of the preformed panel 72. The preformed panel 72 also includes the core 72c.

In the same manner as the first half-joint, the second half-joint section 60 can also be attached to a series of preformed panels one of which is shown at 76 with an adhesive or other fastening means. When the adhesive has completely set, the two sections, preformed panel 72 with half-joint 62 and preformed panel 76 with half-joint 60, can be attached together. This attachment is done by placing an adhesive layer 79 between the half-joints 60 and 62. The inner flange section 68b on half-joint 62 overlaps and attaches to the inner attachment portion 78 of half-joint 60. The inner web portion 68a of half-joint 62 abuts the inner joint section 80 of the half-joint 60. The outer flange portion 82 of the half-joint 60 overlaps and is attached to the outer attachment portion 64a of the half-joint 62. Bolts such as bolts 84 and 86 can be used to connect the half-joint sections 60 and 62 while the adhesive layer 79 sets. Alternatively, blind rivets or other fasteners could be used rather than bolts.

The embodiment of the joint shown in FIG. 5 has the similar benefits as the joint of the embodiment shown in FIG. 4. The use of the two half-joint sections 60 and 62 of FIG. 5 has the additional benefit in that the half-joint sections 60 and 62 may make it easier to put together the tractor-trailer.

FIG. 6 is an exploded perspective view of the embodiment of FIG. 5. Half-joint section 60 is attached to preformed panels 76 and 77. Half-joint section 62 is attached to preformed panels 72 and 73. After these pieces are connected together the two sections 90 and 92 are then connected as discussed above.

FIG. 7 is a partial cross-sectional view showing the connection of two preformed panels 76 and 77. This view is shown along the line A—A' of FIG. 6. In FIG. 7, the preformed panels 76 and 77 are connected together with an adhesive or other fastening means 94. In this manner, a series of wall panels can be attached together in series to connect to with the joint structures of the present invention.

The use of the one piece curved "C"-shaped joint 30 or use of the two combined half-joints 60 and 62 allows for a more efficient structure. Because the bending at the corners of the prior art joint structure of FIG. 2 acts essentially as a hinge, the aluminum joints on a conventional trailer must be made heavy enough to carry the bending loads. In addition, the thin walls of the trailer will do little as far as carrying the bending load. This heavy cornered and thin skinned structure is far less efficient than a true stressed skin or substantially monocoque structure and as a consequence, this prior art structure weighs more than the structure of the present invention.

On the other hand, the joint structures of the present invention allow for the use of flat preformed panels while still producing a substantially monocoque structure. The substantially monocoque structure of the present invention is much more efficient, as the skins of the joint if properly stabilized against buckling, will carry a significant portion of the bending and torsion loads. The flange sections which connect to the preformed panels are tapered so that the joint will not act as a hinge but will transmit loads into the preformed panel. In this manner, the preformed panels contributes to the compressive, tensile and bending loads of the corner structure.

In addition, because the joint does not act like a hinge, the panels and the corner pieces can be made much lighter. In the case of current composite designs, the ends of the vertical panels of the preformed panel and the cross section of the right angled corner joint are major stress risers, both from torsion and bending, and therefore must be made much heavier and thicker than would be required if used with the joints of the present invention.

An additional benefit of the present invention is the ability to use the joint structure with a preformed panel of a constant skin thickness which can be easily formed by pultrusion.

In addition, the joints of the present invention can be filed with foam to help them resist buckling and allow them to support loads in bending and shear. Furthermore, webs of sufficient strength can help prevent local buckling and transfer loads from the inner and outer skin in the event of torsional deflection.

Various details of the implementation and method are merely illustrative of the invention. It will be understood that various changes in such details may be within the scope of the invention, which is to be limited only by the appended claims.

What is claimed is:

1. A structure comprising:

a half-joint section comprising a first skin portion, a second skin portion, a first joint-forming section including a first web section connecting said first and second skin sections and two tapered flange sections formed integrally with the second and first skin portions, respectively, a second joint-forming section including a second web section connecting said second skin portion with an attachment area of said first skin portion and including a second flange section integral with said second skin portion;

a second half-joint section comprising a third skin portion, a fourth skin portion, a third joint-forming section comprising a third web section connecting said third and fourth skin portions and comprising two tapered flange sections formed integrally with the third and fourth skin portions, respectively, and a fourth joint-forming section including a fourth web section connecting said third skin portion with an attachment area of said fourth skin portion and a second flange section integral with said third skin portion;

an adhesive layer for connecting said first and second half-joint sections together wherein said second web section is attached to said fourth web section, said second flange section of the second joint-forming section overlaps and is attached to said attachment portion of said fourth skin portion, and said second flange section of the fourth joint-forming section overlaps and is attached to said attachment area of said first skin portion;

a preformed panel with two sides; and a second adhesive layer connecting said two tapered flange sections of said first half-joint section with portions of said two sides of said preformed panel, said half-joint sections being shaped such that loads may be transmitted from the half-joint sections to the preformed panel to contribute to the support of the compressive, tensile and bending loads of the half-joint section.

2. The structure of claim 1, further comprising a second preformed panel with two sides and;

a third adhesive layer connecting said two tapered flange sections of said third joint-forming section with portions of two sides of said second preformed panel, said second half-joint being shaped such that loads may be transmitted from the second half-joint to the second preformed panel to contribute to the support of the compressive, tensile and bending loads of the half-joints.

3. The structure of claim 2 further comprising additional preformed panels, said additional preformed panels attached said second outer joint forming section with said adhesive material such that said third joint forming section is attached to a second series of preformed panels.

4. The structure of claim 2, wherein said preformed panels comprise two skins sandwiching a foam core.

5. A structure comprising:

a half-joint section comprising a first skin portion, a second skin portion, a first joint-forming section including a first web section connecting said first and second skin portions and two tapered flange sections formed integrally with the second and first skin portions, respectively, a second joint-forming section including a second web section connecting said second skin portion with an attachment area of said first skin portion and including a second flange section integral with said second skin portion;

a second half-joint section comprising a third skin portion, a fourth skin portion, a third joint-forming section comprising a third web section connecting said third and fourth skin portions and comprising two tapered flange sections formed integrally with the third and fourth skin portions, respectively, and a fourth joint-forming section including a fourth web section connecting said third skin portion with an attachment area of said fourth skin portion and a second flange section integral with said third skin portion; and wherein said second web section is attached to said fourth web section, said second flange section of the second joint-forming section overlaps and is attached to said attachment portion of said fourth skin portion, and said second flange section of the fourth joint-forming section overlaps and is attached to said attachment area of said first skin portion.

6. The structure of claim 5, further comprising preformed panels attached to the first and second half-joint.

* * * * *

UNITED STATES PATENT AND TRADEMARK OFFICE
CERTIFICATE OF CORRECTION

PATENT NO. : 5,472,290
DATED : December 5, 1995
INVENTOR(S) : Hulls, John

It is certified that error appears in the above-indentified patent and that said Letters Patent is hereby corrected as shown below:

On Title page:

replace "[75] Inventor: John Hulls, Point Reves, Calif." with:

--[75] Inventor: John Hulls, Point Reyes, Calif.--

In Column 6, line 6 in Claim 1:

replace "connecting said first and second skin sections and two" with:

--connecting said first and second skin portions and two--

Signed and Sealed this

First Day of July, 1997

Attest:

BRUCE LEHMAN

Attesting Officer

Commissioner of Patents and Trademarks